Patented May 17, 1927.

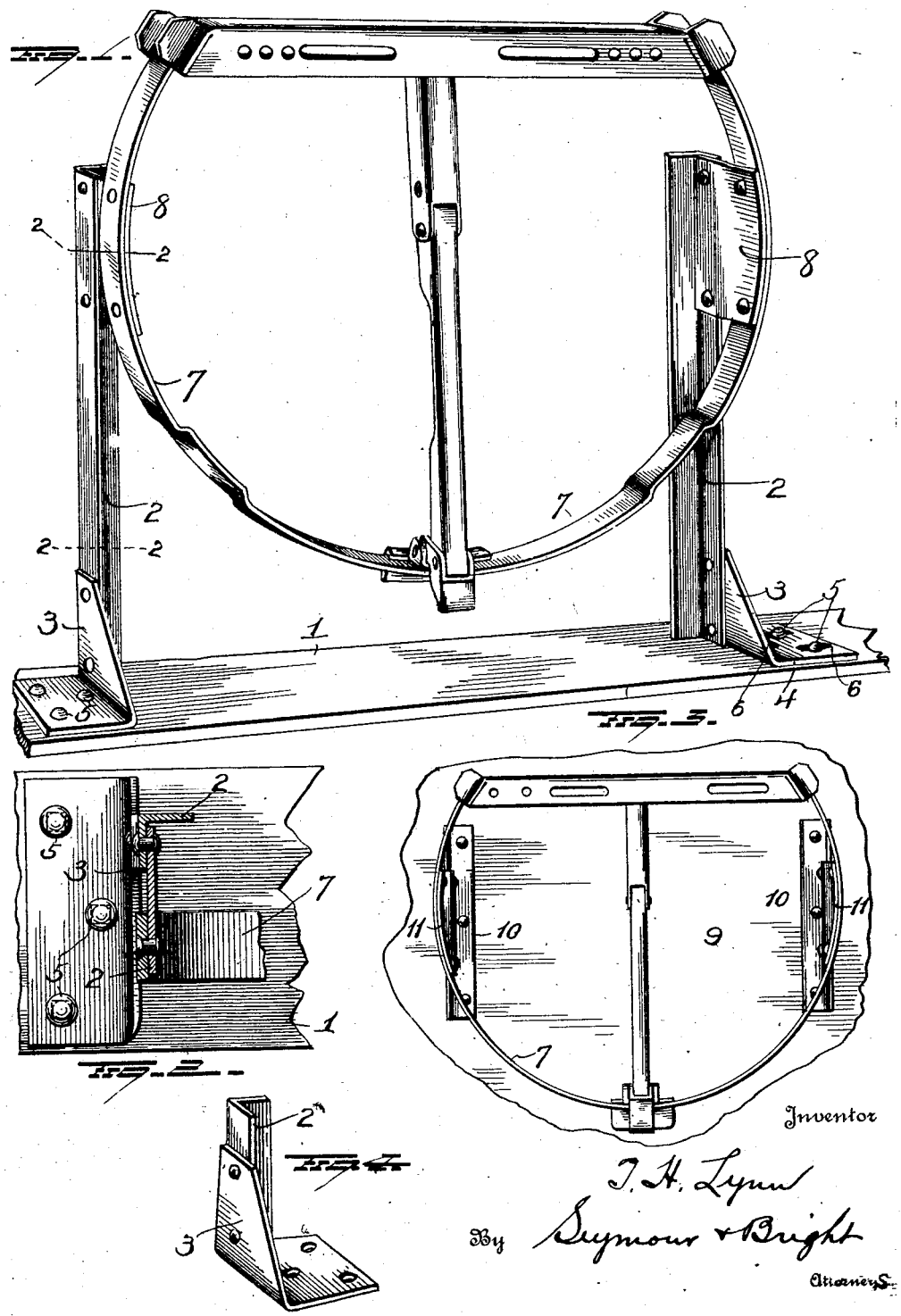

1,629,039

UNITED STATES PATENT OFFICE.

THOMAS H. LYNN, OF WILLIAMSPORT, PENNSYLVANIA.

TIRE CARRIER.

Application filed April 11, 1922. Serial No. 551,509.

This invention relates to improvements in tire carriers and more particularly to means for supporting the carrier and attaching it to an automobile,—one object of the invention being to provide simple and efficient means for securely and effectually connecting a tire carrier with a fixed part of a car at one side of the latter.

A further object is to provide means for attaching a tire carrier to a car, which shall be operable to firmly hold the carrier and minimize the effect of vibration on both the carrier and its attaching means during the travel of the car.

With these and other objects in view, the invention consists in certain novel features of construction and combinations of parts as hereinafter set forth and pointed out in the claim.

In the accompanying drawings, Figure 1 is a perspective view showing an embodiment of the invention; Figure 2 is a view in section on the line 2—2 of Figure 1; Figure 3 is a view showing a modified construction illustrating the tire carrier connected with the side of a car body, and Figure 4 is modified arrangement of anchor plate or member 4.

In Figure 1 of the drawings is represented the running-board 1 of an automobile and on this running-board standards 2—2 are located. Each of these standards may be constructed of angle iron and to the lower end portion of the same, the up-standing member 3 of an anchor plate 4 is securely riveted. The anchor plate 4 for each standard is made of such width and is so located on the running-board 1 that it will project forwardly from the standard and resist any tendency of the standards and the tire carrier attached thereto to tip forwardly, when said anchors are secured to the running-board by means of fastening devices indicated at 5. If desired one of the anchor plates may be provided with elongated slots 6 for the passage of said fastening devices for adjusting purposes.

Instead of causing the horizontal portions of the anchor plates to project outwardly from their vertical portions and from the standards 2, said horizontal portions of the anchor plates may be made to project inwardly as shown in Figure 4.

In the drawings, a tire carrier 7 of the segmental hoop type is shown and to the outwardly projecting flanges of the respective standards 2, plates or elongated arms 8 are rigidly secured near the upper ends of said standards. The outwardly or forwardly projecting portions of said plates or arms are bent to conform to the curvature of the side portions of the carrier,—to which side portions, the plates or arms 8 are securely riveted so that the tire carrier will be disposed over the forwardly projecting portions of the anchor plates and be rigidly mounted upon the running-board in such manner as to resist the transmission of vibration, incident to the running of the car, to the tire carrier and the tire which may be mounted thereon.

In the embodiment of the invention shown in Figure 3, wherein the tire carrier is connected with the side 9 of a car body, preferably just above the running-board, two vertically disposed angle irons or bars 10 are securely riveted or bolted to a panel of the car body and suitably spaced apart for the accommodation of carrier connecting means. In the present instance the carrier connecting means may consist of two plates 11, each having a flange secured to a member of one of the vertical angle bars 10. The outwardly or forwardly projecting portions of the connecting plates 11 are curved somewhat to conform to the contour of side portions of the carrier 7 and are securely riveted to the latter.

Having fully described my invention what I claim as new and desire to secure by Letters-Patent, is:—

A tire carrier comprising a segmental band, spaced standards each having a web extending parallel with the plane of the band and a web extending outwardly at a right angle to the first-mentioned web, plates secured to and projecting outwardly from the outwardly projecting webs of the standards adjacent the upper ends thereof, and rigidly secured to the band, and anchors each consisting of a vertical branch rigidly secured to the outwardly projecting web of a standard at the lower end of the standard and a horizontal member extending laterally from the lower end of the vertical branch to be secured to the running board of a vehicle.

In testimony whereof, I have signed this specification.

THOMAS H. LYNN.